United States Patent [19]

Krankkala

[11] 4,339,364

[45] Jul. 13, 1982

[54] WATER RESISTANT STARCH-BASED CORRUGATING ADHESIVE COMPOSITION

[75] Inventor: Paul L. Krankkala, Woodbury, Minn.

[73] Assignee: Champion International Corporation, Stamford, Conn.

[21] Appl. No.: 173,635

[22] Filed: Jul. 30, 1980

[51] Int. Cl.³ .......................... C09J 3/06; C08L 3/06; C08L 3/08; C09D 3/20
[52] U.S. Cl. .................................... 524/44; 106/213; 525/157; 525/163; 524/52
[58] Field of Search ................. 260/17.4 ST, 17.3, 15, 260/13, 17 R, 17.4 BB, 29.4 UA; 525/157, 163; 106/213

[56] References Cited

U.S. PATENT DOCUMENTS

| | | | |
|---|---|---|---|
| 2,956,962 | 10/1960 | Wise et al. | 260/17.4 ST |
| 3,054,762 | 9/1962 | Rees et al. | 260/17.4 ST |
| 3,770,685 | 11/1973 | Uffner et al. | 260/29.4 UA |
| 4,018,959 | 4/1977 | Demko et al. | 260/17.3 |
| 4,228,045 | 10/1980 | Bezwada | 260/29.4 UA |

*Primary Examiner*—John Kight, III
*Assistant Examiner*—Nathan M. Nutter
*Attorney, Agent, or Firm*—Evelyn M. Sommer

[57] ABSTRACT

An aqueous starch-based adhesive comprising: (a) water; (b) corn starch or wheat starch; (c) a carboxylated styrene-butadiene latex; (d) a thickener; and (e) a cross-linking agent. The thickener and cross-linking agent are collectively present as a minor component. A preferred thickener is a mixture of hydroxyethylcellulose and ammonia and the preferred crosslinking agent is a mixture of a ureaformaldehyde resin and glyoxal. The adhesive has a solids content of between about 35 and about 50 weight percent and pH ranging from about 4.5 to 7.0. The aqueous adhesive can be used to provide corrugated paperboard at rates ranging from 300 to 550 linear feet/minute and has a stable pot life of up to one week. It results in little or no corrosion to corrugating equipment and can be used in the same application and storage systems with conventional starch adhesives. Preparation of the adhesive is simplified because it need not be heated. The adhesive cures in a time period of less than 2 hours and can be used in smaller amounts than conventional alkaline adhesives.

13 Claims, No Drawings

WATER RESISTANT STARCH-BASED CORRUGATING ADHESIVE COMPOSITION

FIELD OF THE INVENTION

This invention relates to a water resistant, starch-based adhesive. More particularly, this invention relates to an aqueous, starch-based water resistant adhesive which has a neutral or acidic pH, and to the use of said adhesive in corrugating paper products at high production rates.

BACKGROUND OF THE INVENTION

Starch-based adhesives have been used extensively in the production of corrugated paperboard and corrugated containers. However, commonly utilized starch adhesives are not normally water resistant. Conventional starch based corrugating adhesives include cooked or gelatinized starch and raw, i.e., unmodified starch particles. The cooked starch functions as a carrier and serves to suspend the unmodified starch granules. The pH of these adhesives is 10 or greater, preferably 12, in order to reduce the gelation temperature of the raw starch. Typically, borax is included to speed gelation. This gelation, along with the interaction of borax and carrier, causes these compositions to function as adhesives upon heating during the corrugation process. The high pH and subsequent solubilization of the unmodified starch after heating result in the poor water resistance of conventional starch adhesives.

The most common means of reducing this water sensitivity involves addition of a urea-aldehyde or ketone-aldehyde resin to insolubilize the adhesive. These resins are base-catalyzed and because of the high pH needed, the pot life of these formulations is short—12 hours or less. Care must also be taken to apply and to cure them properly during the corrugating process. A heavy application of adhesive and a hot stack curing time of 24 hours or greater are commonly required in using these adhesives to provide corrugated products.

Another alternative which has been employed to render the adhesive water-resistant is to lower of the pH of the adhesive to the acid side (pH 3.5-4.5) with a catalyst such as alum or ammonium sulfate while raising the solids from the normal 20-22% to 28-32%. An acid cured, insolubilizing resin is added, urea-formaldehyde or melamine-formaldehyde, for example. An adhesive which is considerably more water resistant than the alkaline system described initially is formed. The greatest disadvantage to this type of adhesive is the limited corrugating speed resulting from the acid pH and consequent high gelling temperature of the adhesive.

As a third alternative, essentially the same system is used with the addition of a polyvinylacetate latex and a further increase in solids to 43-47%. This system increases the corrugating speeds which may be used. However, the low pH of the adhesive results in corrosion of corrugating equipment. Moreover, these adhesives normally have a pot life of only 24 hours or less. The adhesives are often incompatible with regularly run water resistant conventional starch adhesives, requiring separate handling systems and time consuming rinsing of corrugating equipment. Futhermore, the cooked starch portion of the adhesive is prone to premature gelling or "setting back" requiring heating and agitation of the adhesive during storage.

SUMMARY OF THE INVENTION

According to the present invention there is provided an aqueous starch-based adhesive which comprises: (a) water; (b) corn starch or wheat starch; (c) a carboxylated styrenebutadiene latex; (d) a thickener; and (e) a cross-linking agent. The thickener and crosslinking agent are present as minor components, and are utilized collectively in an amount of less than about 10 weight percent based on the total weight of the adhesive. A preferred composition comprises ammonia activated hydroxyethylcellulose as thickener and a mixture of a ureaformaldehyde resin and glyoxal as cross-linking agent. The aqueous adhesive of the present invention has a solids content in the range of between about 35 and about 50 weight percent and a pH in the range of from about 4.5 to about 7.0.

The aqueous adhesive can be used to produce corrugated paperboard at corrugation rates ranging from about 300 to about 550 linear feet/minute. The adhesive has a stable pot life of up to one week and produces little or no corrosion in the corrugating equipment. The adhesive can be used in the same application and storage systems with conventional starch adhesives. Preparation of the adhesive is simplified because there is no need for heating or cooking during mixing of the components. The adhesive cures in a time period of less than 2 hours as compared to a curing time of up to 24 hours for conventional alkaline cured adhesives. Moreover, the adhesive of the present invention can be used in smaller amounts than conventional alkaline adhesives.

Detailed Description of the Preferred Embodiments

The aqueous adhesive of the present invention can comprise (a) water in an amount of between about 25 and about 54 weight percent; (b) uncooked pearl starch, either wheat or corn, in an amount of between about 25 and about 38 weight percent; (c) a carboxylated styrene-butadiene latex in an amount of between about 17 and about 47 weight percent; (d) a thickener in an amount of between about 0.1 and about 1.0 weight percent; and (e) a cross-linking agent in an amount of between about 0.5 and about 5.0 weight percent all based upon the total weight of the wet starch adhesive formulation. It is also preferred to include a base or alkaline material in the adhesive in an amount of between about 0.05 and about 0.1 weight percent. The solids content of the adhesive can be in the range of between about 35 and about 50 weight percent. The pH of the adhesive product can range from about 4.5 to about 7.0.

Preparation of the water-resistant adhesive composition of the present invention is preferably conducted utilizing warm water, i.e., water at a temperature of between about 90° F. and about 105° F. However, when a cold water soluble thickener is utilized, the starch adhesive can be prepared from water at ambient temperature. A pearl cornstarch or wheat starch is added to the water and the mixture agitated for a short period of time. When the adhesive is to be used for corrugating at high speeds, it is preferred to use wheat starch.

Thereafter, a thickener is added to the starch-water mixture. A preferred thickener is hydroxyethylcellulose which is preferably activated with an alkaline or basic material, preferably ammonia. It is preferred to add the hydroxyethylcellulose to the starch-water mixture and agitate the resultant mixture for a short period of time, for example, about 3 to 4 minutes in order to insure uniform mixing. After addition of the cellulose ether, the alkaline material is preferably added to the mixture in an amount sufficient to produce immediate thickening of the mixture. The amount used should be in the range of about 0.05 and about 0.1 weight percent, based on the total weight of the final adhesive mixture. Suitable alkaline materials include ammonia, sodium hydroxide, potassium hydroxide, or the like.

Any of the various conventional thickeners can be used, with or without the addition of a basic material. For instance, a cold water soluble hydroxyethylcellulose can be used with or without a base. Likewise, carboxymethylcellulose or other conventional thickeners comprising modified celluloses such as ethylhydroxyethylcellulose may be used with or without base. Similarly, conventional modified starch thickeners, such as starch hydroxyethyl ethers and other conventional thickeners comprising starch ethers may be used with or without the addition of a base. Conventional thickeners such as those mentioned are well known to those skilled in the art and are discussed in, e.g., *Industrial Gums*, by R. L. Whistler and J. N. BeMiller; Academic Press, 1959, pages 597-740, which pages are hereby incorporated by reference.

Following the addition of the thickener to the starch-water mixture, a carboxylated styrene-butadiene polymer latex is added to the mixture in an amount of between about 17 and about 47 weight percent based on the weight of the final adhesive. Conventional carboxylated styrene-butadiene latexes are well known to those skilled in the art and comprise an aqueous dispersion of a copolymer formed by the emulsion copolymerization of styrene and butadiene together with a small amount of an alpha, beta-ethylenically unsaturated $C_3$ to $C_6$ mono-or dicarboxylic acid or amide thereof such as acrylic or methacrylic acid or acrylamide or methacrylamide. Such carboxylated styrene-butadiene latexes generally comprise a solids content of about 50% by weight. Any of the various conventional carboxylated styrene-butadiene copolymer latexes having a pH in the range of about 4.5 to about 6.0 can be used in the present invention.

The amount of latex added should be controlled to maintain a starch to latex ratio, based on starch weight and latex solids weight, of between about 1:1 and about 4:1, preferably between about 2.3:1 and about 3.8:1. The latex is added to the previously formed mixture of starch, water and thickener, and the resultant mixture is subjected to agitation until homogenous.

Thereafter, a cross-linking agent is added to the mixture in an amount of between about 0.5 and about 5 weight percent, based upon the total weight of the final adhesive. Crosslinking agents which can be used in the present invention comprise urea-formaldehyde resins, melamine-formaldehyde resins and/or glyoxal. An especially preferred crosslinking agent for use in the present invention comprises a mixture of glyoxal and a urea-formaldehyde resin wherein three parts by weight of glyoxal are utilized with two parts by weight of urea-formaldehyde resin. The crosslinking agent is added to the mixture previously formed and the resultant mixture is blended until homogenous.

If desired, a small amount of a conventional defoamer may be added to inhibit foaming and control the homogenity of the adhesive composition.

The thus prepared water-resistant adhesive will have a solids content in the range of between about 35 and about 50 weight percent solids, preferably between about 35 and about 47 weight percent solids. The adhesive has a pH in the range of between about 4.5 and about 7.0.

The adhesive composition of the present invention is utilized in the production of corrugated paperboard and corrugated paperboard products, such as containers. Corrugated paperboard comprises a fluted medium and a liner adhesively joined to the tips of the fluted medium on one or both sides thereof. The adhesive composition of the present invention may be applied to either the fluted medium or the liner; however, it is usually preferred to apply the adhesive to the tips of the fluted medium.

The adhesive may be used in amounts as little as five pounds per 1,000 square feet, based upon the dry weight or solids weight of the adhesive and is preferably used in an amount of between about 5 and about 6 pounds per 1000 square feet.

Any of various paperboard substrates may be utilized in combination with the adhesive composition of the present invention in order to provide corrugated paperboard. As the corrugating adhesive of the present invention provides water resistant properties, it is usually desirable to utilize a water resistant paperboard in combination with the adhesive in order to provide a water resistant corrugated paperboard product. One preferred paperboard product is a wax impregnated paperboard, however, any of the various water resistant paperboard products such as, e.g., resin impregnated paperboard, may be utilized in combination with the water resistant adhesive of the present invention.

It has been found that when the water resistant adhesive composition of the present invention is used in connection with commercial corrugating equipment, surprisingly high production rates can be obtained. Thus, it has been found that production speeds in the range of between about 300 and about 550 feet per minute depending on the equipment, can readily be obtained utilizing the adhesive of the present invention. The use of wheat starch in the adhesive formulation of the present invention is preferred when it is desired to provide high corrugating production speeds.

EXAMPLE 1

A commercial mixer was charged with 223 gallons of water. One hundred fifty grams of a blue dye were added to the water in order that the final adhesive would be tinted. The water was heated to a temperature of between about 95° and 100° F. Thereafter, 1,534 pounds of pearl starch were added to the water and after the starch was mixed with the water, 14 pounds of hydroxyethylcellulose (Cellosize QP-4400H, Union Carbide Corp.) were added to the mixture. The mixture was agitated for four minutes.

Thereafter, one-half gallon of concentrated aqueous ammonia was added and the mixture thickened immediately. The mixture was agitated for a short period of time until it was again of a homogenous viscosity. A carboxylated styrene-butadiene copolymer latex (Dow Latex 620, Dow Chemical Company) in the amount of 1350 pounds was added to the mixture and the resulting composition was agitated for a short period of time. When the mixture was once again homogenous, 100 pounds of urea-formaldehyde resin (Perez 613, American Cyanamide Co.) were added with agitation of the mixture. Thereafter, 150 pounds of glyoxal (Glyoxal 40, Union Carbide Corp.) were added to the mixture. One thousand ml. of a commercially available defoamer (Colloid 999, Colloid Corporation) were added to the mixture and the resulting mixture was agitated for five minutes and thereafter pumped to a clean storage tank.

The thus prepared adhesive composition was stored for one week and examined. No thickening, settling or decomposition was observed.

The composition was thereafter utilized to prepare a water resistant corrugated paperboard. The paperboard utilized was a 69-pound wax impregnated liner and a conventional fluted medium. The corrugated paperboard was satisfactorily produced at a rate of 430 feet per minute, and a water-resistant corrugated paperboard resulted.

EXAMPLE 2

A commercial mixer was charged with 252 gallons of water and the water was heated to a temperature of between about 95° and 100° F. Corn starch in an amount of 1,730 pounds was added to the water followed by 10 pounds of hydroxyethylcellulose (cellosize QP-4400H, Union Carbide Corp.). The mixture was agitated for five minutes. Thereupon ½ gallon of concentrated aqueous ammonia was added and the resultant mixture was agitated for five minutes. A commerically available carboxylated styrene-butadiene latex (Dow Latex 620, Dow Chemical Company) in an amount of 900 pounds was added to the mixture followed by agitation for five minutes. Thereupon 100 pounds of a commerically available urea-formaldehyde resin (Perez 613, American Cyanamide Co.) and 100 pounds of glyoxal (Glyoxal 40, Union Carbide Corp.) were added to the mixture followed by agitation for five minutes.

The thus prepared adhesive composition could be stored for up to a week without thickening, settling or decomposition. The adhesive composition was suitable for producing water-resistant corrugated paperboard at high production rates.

EXAMPLE 3

A commerical mixer was charged with 223 gallons of water and the water was heated to a temperature of between 95° and 100° F. Wheat starch in an amount of 800 pounds and corn starch in an amount of 800 pounds were added to the water followed by the addition of 12 pounds of hydroxyethylcellulose (Cellosize QP-4400H, Union Carbide Corp.) and the mixture was agitated for five minutes. One-half gallon of concentrated aqueous ammonia was added followed by further mixing for five minutes. One thousand, three hundred and fifty pounds of a carboxylated styrene-butadiene latex (Dow Latex 620, Dow Chemical Company) were added to the mixture followed by further agitation for five minutes. Thereupon 100 pounds of a urea-formaldehyde resin (Perez 613, American Cyanamide Co.) were added to the mixture and after five minutes of mixing the final water resistant corrugating adhesive was provided.

EXAMPLE 4

A commerical mixer was charged with 223 gallons of water and the water was heated to a temperature between 90° and 95° F. One thousand, six hundred pounds of corn starch were added followed by the addition of 14 pounds of hydroxyethylcellulose (Cellosize QP-4400H) and the mixture was agitated until homogeneous. Concentrated aqueous ammonia in an amount of one-half gallon was added followed by mixing for five minutes. One thousand, three hundred and fifty pounds of a carboxylated styrene-butadiene latex (Dow Latex 620, Dow Chemical Company) were added and the mixture further agitated until homogeneous. A urea-formaldehyde resin (Reichhold 65-800, Reichhold Chemicals Inc.) in an amount of 150 pounds was added to the mixture followed by the addition of 75 pounds of glyoxal (Glyoxal 40, Union Carbide Corp.) and the resultant mixture agitated for five minutes to provide the final water resistant corrugating adhesive.

EXAMPLE 5

Wheat starch in an amount of 23.3 pounds was mixed with 39.2 pounds of water together with 1.0 pound of a water soluble pregelatinized starch ether derivative (Galactasol ADI, a product of Henkel Corp.), at ambient temperature, for about 10 minutes at which time all of the thickener (pregelatinized starch) had dissolved. Thereupon, 28.4 pounds of a carboxylated styrene-butadiene latex (Dow Latex 620, Dow Chemical Company) and 2.1 pounds of urea-formaldehyde resin (Perez 613, American Cyanamide Co.) were added followed by mixing until the mixture was homogeneous. The resultant 103 pounds of water-resistant corrugating adhesive could be stored without decomposition or settling of the adhesive and the adhesive was suitable for corrugating water-resistant paperboard at high production rates.

Although the invention has been described in considerable detail with particular reference to certain preferred embodiments thereof, variations and modifications can be effected within the spirit and scope of the invention as described hereinbefore, and as defined in the appended claims.

What is claimed is:

1. A water resistant, starch-based adhesive composition having a pH in the range from about 4.5 to about 7.0 consisting essentially of:
    (a) water;
    (b) corn or wheat starch;
    (c) a carboxylated styrene-butadiene copolymer latex, said starch and latex being present in amounts sufficient to provide a starch to latex ratio, based on starch weight and latex solids weight, of between about 1:1 and about 4:1;
    (d) a thickener; and
    (e) a cross-linking agent.

2. The adhesive composition of claim 1, wherein said cross-linking agent constitutes less than about five weight percent based upon the total weight of said composition.

3. The composition of claim 1, wherein said thickener is employed in combination with an alkaline material.

4. The composition of claim 3, wherein said thickener is hydroxyethylcellulose and said alkaline material is ammonia.

5. The composition of claim 2, wherein said cross-linking agent is a urea-formaldehyde or melamine formaldehyde resin.

6. The composition of claim 5, wherein said cross-linking agent further comprises glyoxal.

7. The composition of claim 6, wherein said cross-linking agent comprises glyoxal and a urea-formaldehyde resin in a weight ratio of glyoxal to urea-formaldehyde of 3:2, respectively.

8. The composition of claim 2, wherein said cross-linking agent comprises glyoxal and a urea-formaldehyde resin.

9. The composition of claim 1, wherein said starch is uncooked.

10. The composition of claim 1, wherein said water is present in an amount of between about 25 percent to about 54 weight percent, said starch is present in an amount of between about 25 and about 38 weight percent, said latex is present in an amount of between about 17 and about 47 weight percent, said thickener is present in an amount of between about 0.1 to about 1 weight percent and said cross-linking agent is present in an amount of between about 0.5 and about 5 weight percent.

11. The composition of claim 10, further comprising ammonia in an amount of between about 0.05 and about 0.1 weight percent.

12. The composition of claim 11, wherein said thickener comprises ammonia activated hydroxyethylcellulose and said cross-linking agent comprises a urea-formaldehyde resin, a melamine-formaldehyde resin or glyoxal.

13. The composition of claim 10, wherein the starch to latex ratio is between about 2.3:1 and 3.8:1, based on the weight of the starch and the solids weight of the latex.

* * * * *